(No Model.)
E. H. JOHNSON.
DYNAMO.
No. 431,812. Patented July 8, 1890.
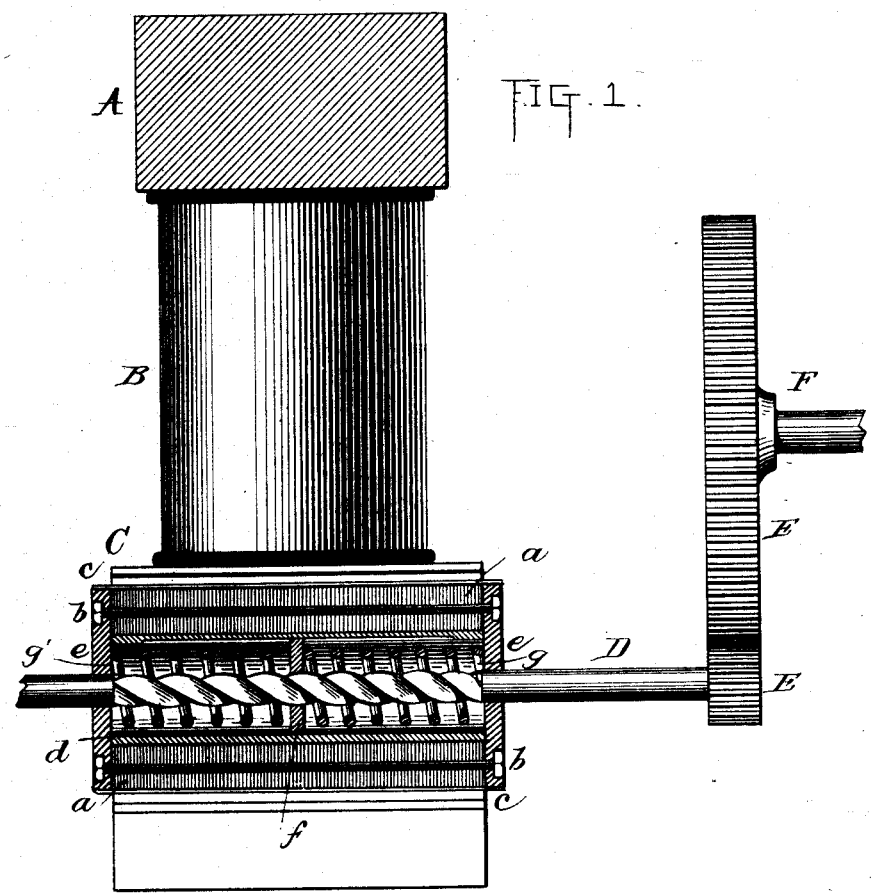
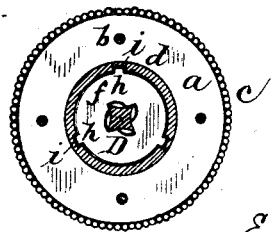
WITNESSES:
INVENTOR
BY
ATTORNEYS.

UNITED STATES PATENT OFFICE.

EDWARD H. JOHNSON, OF NEW YORK, N. Y.

DYNAMO.

SPECIFICATION forming part of Letters Patent No. 431,812, dated July 8, 1890.

Application filed December 27, 1889. Serial No. 335,145. (No model.)

*To all whom it may concern:*

Be it known that I, EDWARD H. JOHNSON, a citizen of the United States, residing at New York city, in the county and State of New York, have invented a certain new and useful Improvement in Dynamo-Electric Machinery, of which the following is a specification.

In my application filed November 18, 1889, Serial No. 330,746, for improvement in power-transmitting devices is set forth an apparatus for the transmission of power from a driving shaft or body to a driven one, consisting of an intermediate connecting part for transmitting power and motion between the two shafts or bodies and an elastic determining device determining the degree of frictional engagement of said intermediate part with one or both of such bodies and so proportioning the power-transmitting capacity or value of the frictional connection in accordance with the power required.

My present invention relates to apparatus of this general character, my object being especially to apply the same to the armatures of dynamo-electric machines employed either as generators or motors for transmitting power and motion to or from such armatures and to make such application in a simple and effective manner, and so that the apparatus will not occupy any additional space. In this arrangement the power-transmitting device is preferably placed inside the armature of the dynamo-electric machine, and such device serves as the connection between the armature and the shaft which passes through it.

My invention consists in the application of power-transmitting devices of the general character above set forth to the armatures of dynamo-electric machines, as hereinafter set forth and claimed.

I have shown in the accompanying drawings (Figure 1 of which is a vertical section of a dynamo-electric machine, and Fig. 2 a cross-section of the armature) a power-transmitting device of a simple kind, shown and described in the application above referred to, and consisting of a nut threaded on the driven shaft and in engagement with the driving shaft or body, and an elastic cushion on each side of the nut opposing its travel on the shaft.

The dynamo-electric machine shown, which may be either a generator or a motor, is of an ordinary type having a horseshoe field-magnet, of which A is the yoke, B one of the magnet-spools, and C a pole-piece. The armature is a cylindrical one, whose core is made up of a series of thin plates $a$, held together by bolts $b$, and which has coils $c$ wound longitudinally upon it. The commutator and its connections are not illustrated in the drawings, and these may be of any suitable or efficient character. The core-plates $a$ are placed on a hollow hub or cylinder $d$, and the armature-shaft D passes through the center of this cylinder and loosely through the end plates $e$ of the core. Within the armature the shaft is formed or provided with a screw-thread, and upon it is placed a threaded disk or nut $f$, on each side of which is placed a spiral spring $g$ or $g'$. The armature-shaft is shown as geared by any ordinary gearing E E to a shaft F, which in the case of a motor receives motion from the armature, and in that of a generator is employed to drive the same. The nut $f$ has lugs $h$ entering internal slots or grooves $i$ of the cylinder $d$.

The operation is as follows: With a motor, when current is applied and the armature begins to revolve, it turns the nut $f$, so that the same is screwed along the shaft in one direction or the other, according to the direction of revolution, and the nut continues to travel along the shaft, compressing the spring which opposes it until the pressure of such spring becomes so great as to force the nut against the screw-thread with sufficient force to turn the shaft. Thus at the moment of starting there is no load on the armature, and the armature is allowed to make several revolutions, and therefore to develop speed and counter electro-motive force, before the full load is placed upon it. The distance which the nut will travel on the shaft will depend on the amount of load on the shaft to be started, and in operation the position of the nut and the degree of friction with which it engages the shaft, and consequently the power-transmitting value or capacity of the mechanical connection between the armature and its shaft, will vary with changes in the load. When current is removed from the armature the spring will force the nut back along the screw-thread to its central position. With a generator the operation is substantially the same. The shaft being started by the application of power thereto, the nut moves along the shaft until it engages therewith with sufficient friction to turn the armature, and the power is thus applied and the generator started gradually.

The power-transmitting device itself is claimed generally in my application above referred to, and is therefore not claimed herein.

What I claim is—

1. The combination, with a hollow armature and a shaft passing through the same, of an intermediate part located within said armature and mechanically connected therewith and movable along said shaft to a point at which it engages therewith, and an elastic determining device determining the point of engagement, substantially as set forth.

2. The combination, with a hollow armature and a threaded shaft passing through the same, of a movable body threaded on the shaft within the armature and connected mechanically with the armature, and an elastic cushion opposing the travel of said movable body on the shaft, substantially as set forth.

3. The combination, with a hollow armature and a threaded shaft passing through the same, of a movable body threaded on the shaft within the armature, and an elastic cushion on each side of said body opposing its travel on the shaft in either direction, substantially as set forth.

4. The combination, with the internally-slotted hollow armature, and the threaded shaft passing through it, of the nut on said shaft, having lugs entering the armature-slots, and an elastic cushion opposing the travel of said nut on the shaft, substantially as set forth.

This specification signed and witnessed this 26th day of December, 1889.

EDWARD H. JOHNSON.

Witnesses:
W. PELZER,
H. W. SEELY.